United States Patent

Wolf

[15] 3,665,805
[45] May 30, 1972

[54] MACHINE TOOL

[72] Inventor: Heinz K. Wolf, Willoughby Hills, Ohio

[73] Assignee: The New Britain Machine Company, New Britain, Conn.

[22] Filed: Dec. 5, 1969

[21] Appl. No.: 882,502

[52] U.S. Cl. ........................................90/14, 90/15, 90/16, 90/21 R, 408/66
[51] Int. Cl. ......................................B23c 1/12, B23p 39/14
[58] Field of Search .......................90/15, 14, 16, 11 R, 21 R; 408/13, 66

[56] References Cited

UNITED STATES PATENTS

| | | | |
|---|---|---|---|
| 3,139,000 | 6/1964 | Stephan | 90/21 X |
| 3,232,141 | 2/1966 | Swanson et al. | 90/14 X |
| 2,255,176 | 9/1941 | Lucas et al. | 90/16 X |

*Primary Examiner*—Gil Weidenfeld
*Attorney*—David S. Urey, Alan C. Rose and Alfred B. Levine

[57] ABSTRACT

A machine tool including a vertically movable spindlehead member having an extensible and retractable tool spindle member, and a work-supporting compound slide assembly having two slide members movable in directions at right angles to one another in horizontal planes. All members are selectively movable in opposite directions along their respective paths of movement at feed and transverse rates by two variable speed motors, one connectable to the spindlehead or the tool spindle and the other to either of the two slide members of the work-supporting compound slide. The motors are connected to their respective tool and work-moving members through discrete transmissions of the continuously meshed gear type under the control of hydraulically actuated clutches. Spindle feed is alternatively provided from a spindle drive motor to correlate feed with spindle rotation. Brake discs selectively deflectable against fixed abutments and connected to rotatable parts will maintain selected tool and work-carrying members in fixed positions.

15 Claims, 4 Drawing Figures

Patented May 30, 1972

INVENTOR.
HEINZ K. WOLF
BY Watts, Hoffmann,
Fisher & Heinke
ATTORNEYS.

Patented May 30, 1972
3,665,805
3 Sheets-Sheet 2

INVENTOR.
HEINZ K. WOLF
BY Watts, Hoffmann,
Fisher & Heinke
ATTORNEYS.

MACHINE TOOL

FIELD OF THE INVENTION

This invention relates to machine tools and especially to horizontal boring, drilling and milling machines.

SUMMARY OF INVENTION

The present invention provides a machine tool with a movable spindlehead, a rotatable tool-carrying spindle carried by the spindlehead, and a work-supporting compound slide assembly. The tool-carrying spindle may be extensible and retractable. The head slide members are selectively movable along respective axes at both feed and traverse rates by two variable-speed motors arranged in such a manner that one motor will move the head and the other will move either of two slide members of the work-supporting compound slide. As a result, the relative position of a tool and the work to be machined can be changed along two axes simultaneously yet with independent control. This arrangement permits much faster positioning than is possible with machines that utilize only a single drive motor for all movable members, yet without significant sacrifice in speed and flexibility over machines having separate motors for each movable member. More specifically, it is estimated that in approximately 90 percent of typical machining operations performed on horizontal boring machines and milling machines, optimum machine utilization in positioning the tool and work requires relative movement along only two axes. Also, no more than two axes of movement are utilized during actual machining for drilling, boring or profile work. By operating from a single drive two of the machine movements that are typically not utilized simultaneously, an efficient yet economical machine is obtained.

By way of example, in a horizontal boring, drilling and milling machine a tool is carried by a spindle in a head movable vertically on a column. The work is carried on a table which in turn is carried by a saddle, the two forming a compound slide with the saddle movable horizontally across the head column transversely of the axis of rotation of the spindle and the table movable toward and away from the column. Combined movement of the head and saddle by separate drives will efficiently position the tool opposite any point on the facing surface of the work. During this positioning neither spindle extension or retraction nor table movement is typically desired and hence the unavailability of the two drives to the spindle and table results in no loss of flexibility or positioning time. After the work and tool are positioned, a boring or drilling operation utilizes spindle extension and retraction or table movement without head or saddle movement so that no disadvantage is suffered by the unavailability of the drives to the head and saddle. In milling operations, profiling is achieved by the use of the independent drives of the head and saddle to provide horizontal and vertical relative movement of tool and work.

A drive arrangement for a tool spindlehead and a compound work slide is provided that achieves substantial compactness and reduces the shafting typically required to operate these parts over any but individual drives, especially with respect to the compound slide. This reduced shafting results in a stiffness that reduces backlash through the drive transmission, which is necessary for accuracy, especially in automated machines. In the compound slide, the drive motor, transmission and output drives are carried by the slide that is supported directly on the bed, and are connected to fixed, cooperable, drive members on the bed and second slide. This especially reduces the intermediate shafting usually required between the motor drive and final drive member for each slide, maintains high stiffness throughout the drive and provides a compact design. The transmissions for the drive motors are of a two-speed planetary type in the embodiment shown, and the power trains utilize constant-mesh gearing throughout. This further reduces parts and further contributes to the compactness and reliability of the machine.

In a preferred embodiment, the slide members, head and spindle are driven from a three-phase alternating current source by a proportional drive system that utilizes variable-speed D.C. motors controlled through electrical circuits utilizing two silicon controlled rectifiers in each power phase of a three-phase electrical system. This provides wide speed range capability, smooth power flow, precise feed rate regulation, compactness, and reliability. This drive system with its wide speed range capability, in particular, facilitates the simplified transmission construction and its attendant advantages. A notable advantage is that with a proportional drive such as an SCR-controlled variable-speed D.C. motor and a constant-mesh gear drive, the movable members of the machine tool can be decelerated more efficiently and hence positioned in a substantially shorter time than with the conventional servo-drive three-speed transmissions that utilize fixed speed motors and reduce travel speed in defined steps. Shorter positioning time results in higher productivity which is a primary consideration in the selection of a machine.

Once the movable members of the machine are positioned, accuracy is maintained by brake discs carried by rotatable transmission shafts and selectively deflectable against fixed abutments. This arrangement eliminates lost motion typically occasioned by tolerances between brake parts.

Although in the particular embodiment shown the head and spindle extension drive motor is not carried by the head, it is contemplated that it could be, in which case a further reduction of intermediate shafting could be attained. In the present instance, the advantage in reducing the weight of the head, which moves vertically rather than horizontally as the saddle, and the somewhat greater ability of the spindle to tolerate less stiffness while maintaining sufficient accuracy, make it more advantageous to mount the motor for the head and spindle extension on the column.

For flexibility, spindle feed is primarily operated independently from the spindle rotary drive. An alternate spindle feed is provided, powered by the spindle rotary drive transmission. When the alternate spindle feed is used, the rate of spindle extension is directly proportional to spindle rotation and is useful, for example, to accurately machine a screw thread.

The above and other features and advantages of the present invention will become better understood from the detailed description of the invention that follows, when considered in connection with the accompanying drawings.

DETAILED DESCRIPTION OF PREFERRED EMBODIMENT

The preferred embodiment of the invention is a horizontal boring, drilling and milling machine A having a horizontal bed portion B and a vertical column C extending upward from or at one side of the bed. A spindlehead member D is guided by the column C for vertical movement in a straight path and carries a spindle member E, typically for supporting a tool. The spindle is rotatable about its longitudinal axis to rotate the tool, and is movable for extension and retraction in a straight path along its axis, normal to the path of movement of the head member. A compound slide F is supported on the bed B and typically carries the work being machined by the tool. The compound slide includes a first slide member G, hereinafter characterized as a saddle, movable in a horizontal straight path on the bed, transverse to the vertical column and spindle axis, and a second slide member H, hereinafter characterized as a table, movable in a horizontal straight path on the saddle, transverse to the saddle movement and column, and parallel to the spindle axis.

Figure 1:
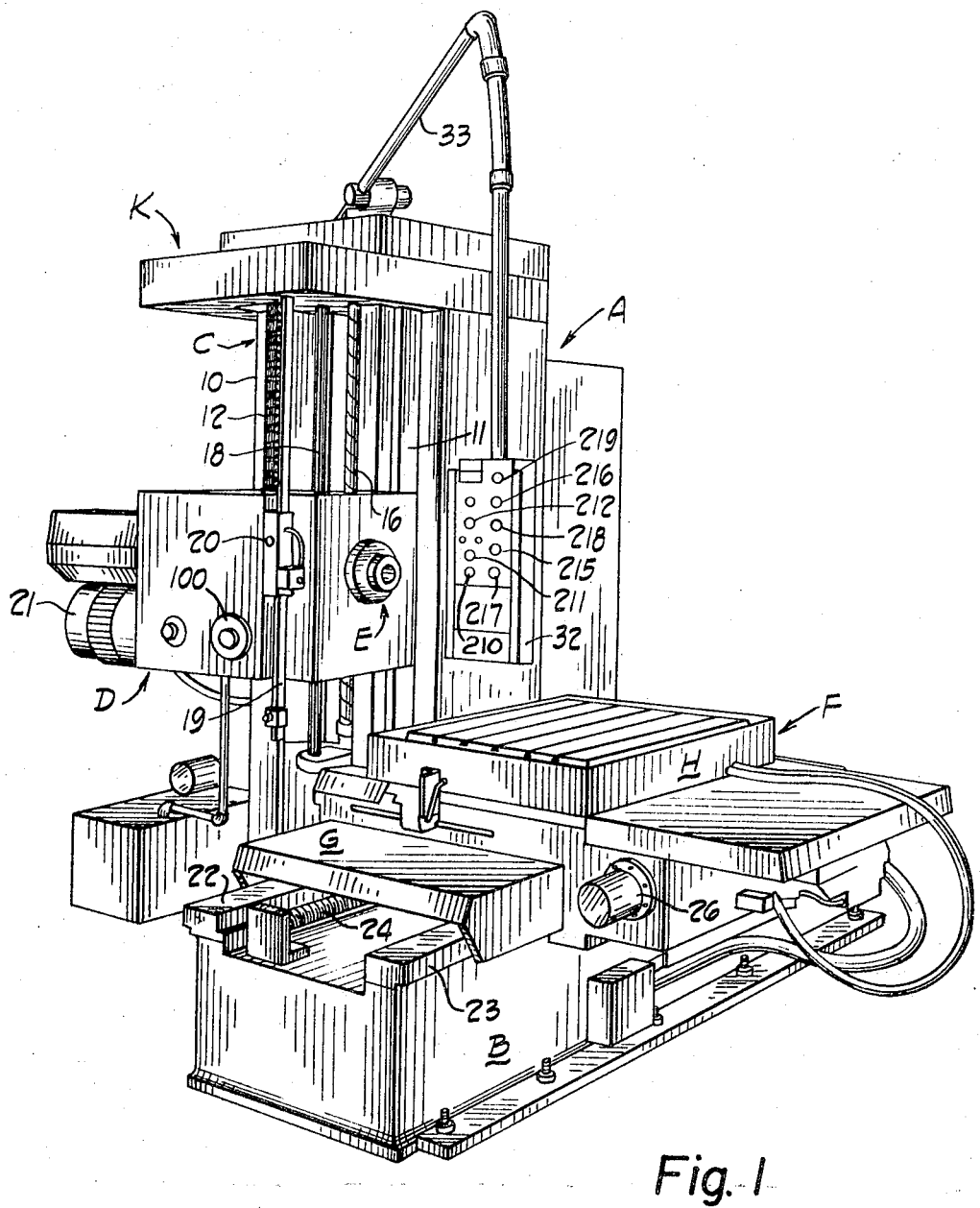
FIG. 1 is a perspective view of a machine tool embodying the present invention.
Figure 2:
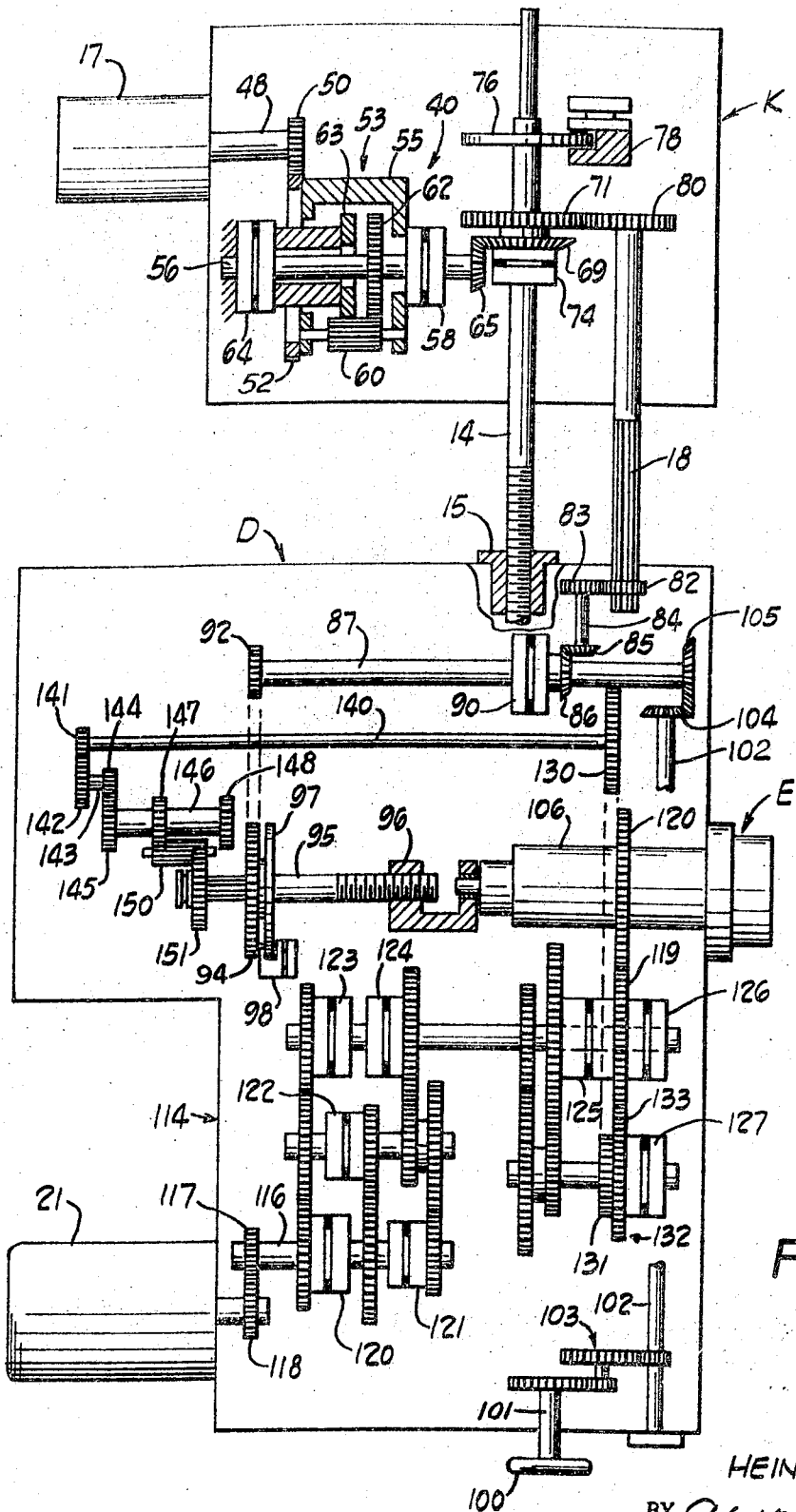
FIG. 2 is a diagrammatic view, principally in elevation, showing the transmissions of the machine tool of FIG. 1, for moving the spindlehead member relative to the column, for extending and retracting the spindle carried by the head member and for rotating the spindle.

The head member D moves along vertical guideways 10, 11 on the column, is counterweighted by a counterweight in the column C connected to the head member by a chain 12, and is vertically positioned by a vertical head screw 14 threaded through a nut 15, see FIG. 2, fixed in the head member D. The screw 14 is rotatably supported at its upper end in a crown member K on the top of the column C and at its lower end in a suitable bearing on the lower part of the column. As shown, the head screw 14 is enclosed by a vertically extensible sleeve 16 for protection. A variable-speed drive motor 17, see FIG. 2, located at the top of the column C provides power for rotating the head screw 14 to raise and lower the head member and a splined shaft 18 for extending and retracting the spindle member E relative to the head member. The splined shaft 18 is rotatably supported in the crown member H and extends downwardly through the spindlehead member. A vertical gauge bar 19 extends from a cantilevered part of the crown member or housing K on the vertical column and cooperates with dial indicator 20, etc., to indicate the vertical position of the head member relative to a reference point on the machine. A spindle drive motor 21 is carried by the head member D for driving the spindle in rotation.

Figure 3:
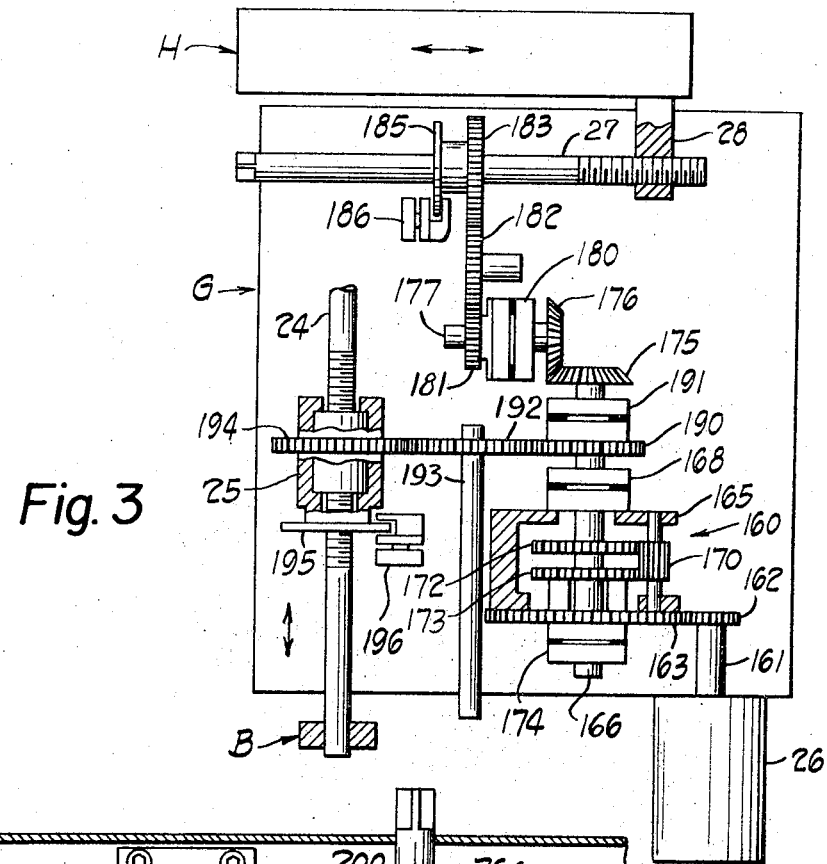
FIG. 3 is a diagrammatic view, principally in plan, showing the drive and transmission of the machine tool of FIG. 1, for moving the slide members of the compound slide carried by the bed of the machine.

The saddle G is movable along horizontal ways 22, 23 on the bed B by means including a saddle screw 24 fixed to the bed and a rotary nut 25, see FIG. 3, carried by the saddle and driven by a variable-speed drive motor 26 carried by the saddle. Horizontal table ways on the top side of the saddle extend transversely of the saddle ways on the bed, and support the table H for movement transversely of the direction of movement of the saddle. The table is moved by a rotatable table screw 27, see FIG. 3, carried by the saddle which screw has threaded engagement in a nut 28 fixed to the underside of the table. The table screw 27 is driven by the slide drive motor 26. A gauge bar (not shown) is associated with the table and a similar gauge bar is associated with the saddle and support means to indicate the position of each slide relative to reference points on the machine. A pendant control panel or station 32 is suspended in cantilevered fashion from a supporting conduit 33 in a convenient location adjacent the head member, saddle and table and carries the manual controls necessary for operating the machine.

The drive motor 17 is connected to one side of the housing or crown member K and is selectively connected to the spindlehead member D and the spindle by a so-called continuous mesh drive including a two-speed planetary transmission indicated generally by reference numeral 40. The output or drive shaft 48 of the motor 17 has a gear 50 keyed thereto and continuously in mesh with a ring gear 52 fixed to a planet gear carrier or support 55 of the planetary speed change transmission and which carrier is rotatably supported by a rotatable shaft 56 in the crown member K. The carrier or planet gear support 55 is selectively coupled to or uncoupled from the shaft 56 by an electrically controlled, hydraulically actuated clutch 58. A wide-faced planet gear 60 rotatably carried by the planet gear support 55 meshes with two sun gears 62, 63 carried on the shaft 56. The sun gear 62 is fixed to the shaft 56 while the sun gear 63 is freely rotatable on the shaft but can be selectively connected by an electrically controlled, hydraulically actuated clutch 64 to the housing K so as to prevent rotation thereof. The sun gear 62 has a slightly greater number of teeth than the sun gear 63. A bevel gear 65 is fixed to the end of the shaft 56 and drives a bevel gear 69 having a spur gear 71 fixed to the hub thereof. Both gears are rotatable in the housing or crown K about the upper non-threaded part of the head screw 14. The construction is such that the gear 65 can be rotated at a relatively high speed by the motor 17 when the clutch 58 is actuated to connect the gear support 55 to the shaft 56 and the clutch 64 is disengaged so that the sun gear 63 idles freely about the shaft 56. Movement of the planet gear 60 about the sun gear 62 merely drives the sun gear 63 idly. The bevel gear 65 is driven at a relatively slow speed when the clutch 58 is de-energized to disconnect the gear support 55 from the shaft 56 and the clutch 64 is energized to hold the sun gear 63 stationary. In such condition, orbiting of the planet gear 60 about the fixed sun gear 63 drives the sun gear 62 at a very slow speed due to the differential in the number of teeth between the two sun gears, and thereby drives the shaft 56 at the slow speed.

The bevel gear 69 and its associated spur gear 71 which are rotatable about the upper part of the head screw 14 can be selectively coupled to the screw 14 by an electrically controlled fluid actuated clutch 74. A brake disc 76 fixed to the screw 14 above the gear cluster can be clamped in fixed position against a stationary brake pad by a brake actuator assembly 78 fixed to the housing K to secure screw 14 against rotation and in turn the head member D in a fixed position relative to the column C.

The gear 71 is continuously in mesh with a gear 80 fixed to the upper end of the spline shaft 18 and drives the spline shaft at all times that the gear 65 is driven. The lower end of the shaft 18 has a gear 82 splined thereon which gear is rotatably supported in the spindlehead member D and is continuously in mesh with the gear 83 fixed to a stud shaft 84 also rotatably supported in the spindlehead member. The shaft 84 has a bevel gear 85 keyed thereto which is continuously in mesh with a bevel gear 86 fixed to the drive member of an electrically controlled, hydraulically actuated clutch 90. The driven member of the clutch 90 is rotatably supported on a shaft 87 rotatably supported in the spindlehead member and the driven member of the clutch is keyed to the shaft 87 so that the shaft 87 can be rotated upon rotation of the gear 86 by engagement of the clutch 90. The shaft 87 has a gear 92 keyed thereto which gear is continuously in mesh with a gear 94 keyed or fixed on a spindle feed screw 95 rotatably supported in the spindlehead and having threaded engagement with a nut 96 rotatably connected to the rear part of the spindle E but fixed against axial movement relative to the spindle. A brake disc 97 fixed to the non-threaded end of the screw 95 can be clamped in fixed position against a stationary brake pad by a brake actuator assembly 98 fixed to the spindlehead to secure the spindle feed screw 95 against rotation and in turn the spindle E against axial movement in the spindlehead member.

Provision is made for manually moving or positioning the spindle E axially in the form of a hand wheel 100 at the front of the spindlehead member and fixed to a shaft 101 rotatably supported in the spindlehead member. The shaft 101 is continuously connected to a shaft 102 by reduction gears, designated generally as 103. The shaft 102 is in turn connected by bevel gears 104, 105 to the shaft 87.

The spindle E is slidably keyed within a quill or sleeve member 106 rotatably supported in the spindlehead member D and adapted to be driven from a spindle drive motor 21 by a speed change transmission 114, the input shaft 116 of which is connected by continuously meshed gears 117, 118 keyed thereto and to the drive shaft of the motor 21, respectively. The output or drive member of the speed change transmission is a gear 119 continuously in mesh with a gear 120 fixed on the quill member 106.

The particular construction of the transmission 114 forms no part of the present invention and is not herein described in detail. Suffice it to say that it is of the constant mesh gear type in which the desired output speeds are obtained by selectively connecting and disconnecting suitable gears of the transmission to respective shafts upon which they are rotatably supported by electrically controlled fluid-operated clutches 120 to 127.

The spindle E can be selectively fed or moved axially as a function of or in predetermined relation to its rotation by a gear drive including a gear 130 continuously in mesh with a gear 131 of a gear cluster 132 in the transmission 114. A second gear 133 of the gear cluster 132 is continuously in mesh with the output gear 119 of the transmission 114. The gear 130 is fixed to a shaft 140 rotatably supported in the spindlehead member which shaft has a gear 141 fixed thereto and which is in continuous mesh with a gear 142 keyed to a shaft 143 also rotatably supported in the spindlehead member. The shaft 143 has a gear 144 fixed thereto and continuously in mesh with a gear 145 fixed to a shaft 146 having gears 147, 148 keyed thereto. The gear 147 is continuously in mesh with a wide-faced gear 150 rotatably supported in the spindlehead member D and adapted to be selectively engaged by a gear 151 slidably keyed to the spindle feed screw 95. The gear 151 is adapted to be shifted by electrically controlled solenoids between a neutral position in which it is free to rotate with the spindle feed screw 95 or into engagement with the gear 150 to rotate the spindle feed screw 95 in one direction or engagement with the gear 148 to rotate the spindle feed screw in the opposite direction. It will be understood that when the spindle screw 95 is driven from the motor 17, the gear 151 will be in its neutral or disengaged position and when the spindle feed screw 95 is driven from the spindle E the clutch 90 will be disengaged.

The constant mesh drives for the saddle G and table H are diagrammatically shown in FIG. 3. Saddle movement on the bed B is produced by rotating the nut 25 carried by the saddle G about the saddle screw 24 fixed to the bed B. Table movement on the saddle is produced by rotating the table screw 27 carried by the saddle G within the cooperating nut 28 fixed to the table H. The rotatable saddle feed nut 25 and the rotatable table feed screw 27, along with the drive motor 26 and the drives for selectively connecting the motor 26 to the nut 25 and screw 27 are carried by the saddle G.

The drive motor 26 is fixed to the front side of the saddle member G and is selectively connected to the saddle member G or the table member H by so-called continuous mesh drives, as previously mentioned, including a two-speed planetary transmission indicated generally by reference numeral 160. The output or drive shaft 161 of the motor 26 has a gear 162 keyed thereto and continuously in mesh with a ring gear 163 fixed to a planet gear carrier or support 165 of the planetary speed change transmission and which carrier is rotatably supported by a rotatable shaft 166 in the saddle member G. The carrier or planet gear support 165 is selectively coupled to or uncoupled from the shaft 166 by an electrically controlled, hydraulically actuated clutch 168. A wide-faced planet gear 170 rotatably carried by the planet gear support 165 meshes with two sun gears 172, 173 carried on the shaft 166. The sun gear 172 is fixed to the shaft 166 while the sun gear 173 is freely rotatable on the shaft but can be selectively connected to the saddle member G by an electrically controlled, hydraulically actuated clutch 174 so as to prevent rotation thereof. The sun gear 172 has a slightly greater number of teeth than the sun gear 173. A bevel gear 175 fixed to the shaft 166 drives a bevel gear 176 on a shaft 177 rotatably supported in saddle member G. The shaft 177 has the driven element of an electrically controlled, hydraulically actuated clutch 180 fixed thereto and rotatably carries the driven element of the clutch. The driven element of the clutch has secured thereto a gear 181 concentric with the shaft 177 and continuously in mesh with a gear 182 which gear is in turn continuously in mesh with the gear 183 fixedly carried by the table screw 27.

The drive from the motor 26 to the table member H is such that the shaft 166 and in turn the table member H can be driven or reciprocated at relatively high speed from the motor 26 when the clutches 168 and 180 are engaged and the clutch 174 disengaged and at a relatively slow speed when the clutch 168 is disengaged and the clutches 174, 180 engaged. With the planetary transmission 160 operating in the last-mentioned mode, the planet gear 170 orbits about the gear 173 driving the gear 172 at a low speed due to the differential in the number of teeth between the two gears 172, 173. A brake disc 185 is fixed to the screw 27 and can be clamped in fixed position against a stationary brake pad by a brake actuator assembly 186 fixed to the saddle member G to secure screw 27 against rotation and in turn the table member H in a fixed position on the saddle member G.

The saddle nut 25, which is rotatably supported in the saddle member G, can be driven from the shaft 166 through a gear 190 rotatably supported on the shaft 166 and adapted to be selectively connected thereto by an electrically controlled, fluid-actuated clutch 191. The gear 190 is continuously in mesh with the gear 192 fixed to a shaft 193 rotatably supported in the saddle member G. The gear 192 is continuously in mesh with the gear 194 fixed to the nut 25. By engaging the clutch 191 the saddle can be moved by the motor 26 in a manner similar to that in which the table member H can be moved, as previously explained. A brake disc 195 fixed to the screw 24 can be clamped in fixed position against a stationary brake pad by a brake actuator assembly 196 fixed to the saddle member G to secure screw 24 against rotation and in turn the saddle member G in a fixed position on the bed member B.

Figure 4:
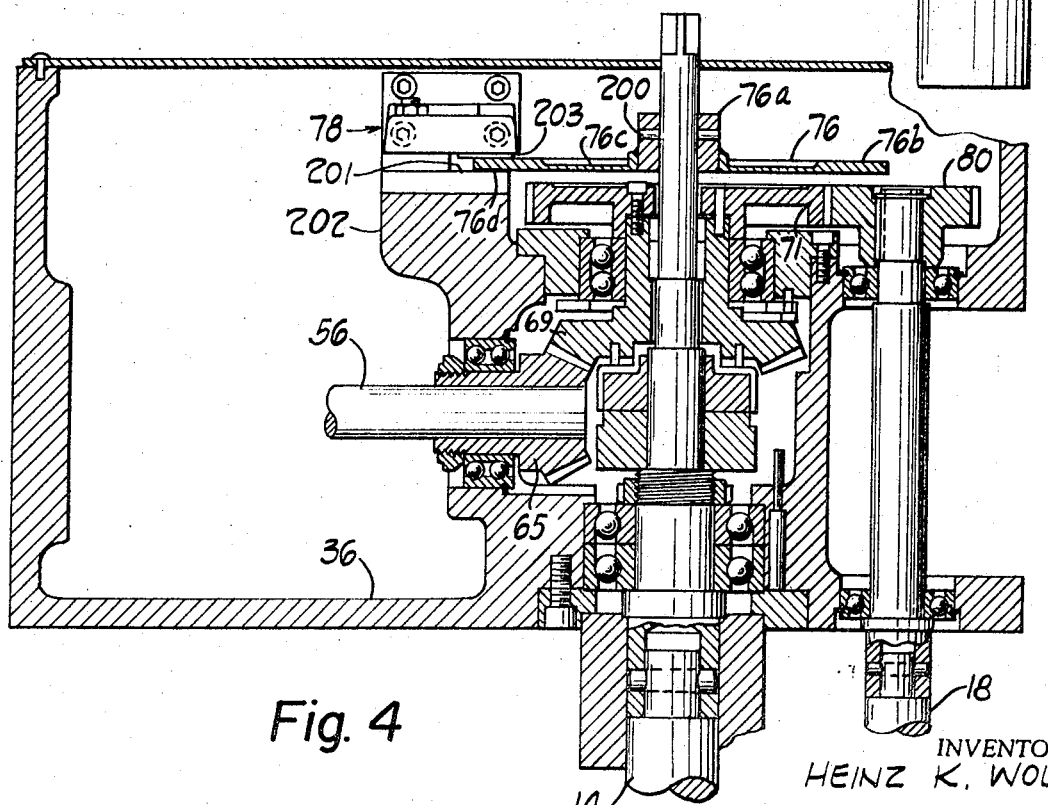
FIG. 4 is a vertical section taken through a part of the drive transmission at the top of the column of the machine tool of FIG. 1, showing constructional details of a brake for retaining the head member in a fixed position.

The brake assemblies or units including the brake actuators 78, 98, 186 and 196 for preventing rotation of certain transmission elements and drive members are alike and only the brake assembly associated with the lead screw 14 is shown and described in detail. The brake disc 76, of the brake assembly referred to, has a hub portion 76a, see FIG. 4, secured to the shaft extension of the lead screw 14 by a tapered pin 200, a relatively thick, annular, peripheral portion or rim 76b, and a thin web portion 76c connecting the hub 76a to the peripheral portion 76b. The thin web portion 76c permits flexing of the peripheral portion of the disc in a direction generally perpendicular to the plane of the disc. A part of the peripheral portion 76b of the disc passes across a flat surface 201 of an abutment member 202 fixed with respect to the housing 36. A small clearance gap approximately 0.001 to 0.002 inch is established between the flat surface 201 of the abutment member 202 and an opposed radial face 76d of the disc 76. A brake pad 203 is located adjacent the opposite side peripheral portion 76b of the disc 76 directly opposite the flat abutment surface 201. The brake pad 203 is a part of the brake actuator 78 and is carried by the piston rod of a reciprocating-type hydraulic motor forming a part of the actuator 78. The brake pad 203 is spring biased in an upwardly direction and is moved in a downwardly direction by the application of hydraulic pressure to the upper side of the cylinder part of the motor to force the pad against the disc 76 and flexes the peripheral portion of the disc that is contacted by the pad against the abutment 201 with sufficient force to restrain rotation of the disc and the associated head screw 14. Because the disc is flexed against a fixed abutment, there can be no backlash or play between component parts of the brake or between the brake and the associated head screw 14. Upon relief of the hydraulic actuating pressure to the brake, the brake pad 203 is withdrawn from the disc, allowing the disc to spring clear of the abutment surface 201.

The motors 17 and 26 are, as previously stated, a variable-speed motor and any suitable combination motor and control therefor may be employed. The preferred motor drive is the so-called silicon-controlled rectifier drive disclosed in a copending application of John F. Reed, Ser. No. 835,441, filed June 23, 1969, entitled "Motor Drive System" and which system utilizes silicon-controlled rectifiers and a feedback loop for operating a reversible direct current motor from an alternating current source.

The motors 17 and 26 drive feedback tachometers that provide a feedback voltage signal of one polarity or another depending on the direction of rotation of the motor, which voltage signal accurately reflects the speed of rotation of the motor. The output from the tachometer is compared with an input reference signal that indicates a desired speed of the motor. If the reference signal and the signal from the tachometer are not equal in amplitude, silicon-controlled rectifiers that rectify the input A.C. power supplied to the D.C. motor become conductive for greater or lesser portions of each half cycle to increase or decrease the speed of the motor and thus vary the output signal from the feedback tachometer until it and the reference speed signal are equal. The drive system operates to maintain the speed of the motor at a substantially constant predetermined speed regardless of load conditions on the motor.

In the present instance the input reference speed signal is obtained from a rotary step potentiometer 210, preferably calibrated in inches per minute of slide travel with the transmissions 40, 160 in their lowest speed range, and alternatively from a manually operated generator tachometer 211 both of which are located on the pendant control station 32. The various calibrated positions of the potentiometer 210 provides a different fixed reference voltage to indicate a different speed of slide movement. Speeds between the potentiometer steps can be obtained by a feed rate override control 212.

Referring to the spindlehead, the direction of the spindlehead movement either up or down is determined by manual operation of the spindlehead control switch 215. The switch is similar to that shown in U.S. Pat. to H. N. Stephan, Nos. 3,139,000 and 3,139,491, and has two positions at opposite sides of a neutral or off position. The first position on either side of the off position is the feed position and in which position the control handle for the switch can be latched and the second position is the rapid traverse position. The switch is so oriented that the neutral position is in a horizontal plane and when the control lever is moved in an upwardly direction the feed and rapid traverse movements of the spindlehead are in an upwardly direction. When the control lever is moved in a downwardly direction to its neutral position the feed and rapid traverse movement of the spindlehead are in a downwardly direction.

Movement of the control lever 215 into either of its feed positions places the transmission 40 in its low speed mode with the clutch 58 disengaged and the clutch 64 engaged and initiates movement of the spindlehead at a feed rate determined by the setting of the feed rate potentiometer 210 and the feed rate override control lever 212. When the control switch 215 is moved to either of its rapid traverse positions the transmission 40 is shifted to its high speed mode, that is, with the clutch 58 engaged and clutch 64 disengaged. A schematic diagram of this circuitry is shown in U.S. Pat. No. 3,573,590, issued on Apr. 6, 1971 and is not herein shown and described. Switches 216, 217 and 218, similar to the switch 215, are used to control the movement of the spindle E, the bottom slide or saddle G, the top slide or table H and a similar two-position switch 219 is employed to control rotation of the spindle E.

It will be apparent from the above description, that this invention provides a machine tool with a work-supporting compound slide assembly having two slide members movable in directions at right angles to one another, and a movable tool spindle head member having an extensible and retractable tool spindle member, in which all members are selectively movable in either of two opposite directions along their respective paths of movement at feed and traverse rates by two variable-speed motors, one connectable to the tool spindlehead or the tool spindle and the other to either of the two slide members of the work-supporting compound slide; in which the motors are connected to their respective tool and work-moving members through drives of the continuously meshed gear type under the control of selectively actuated clutches; in which spindle feed is alternatively provided from a spindle drive motor to correlate spindle feed with spindle rotation; and in which brake discs are constructed to be deflectable against fixed abutments and are connected to rotatable parts to maintain selected tool and work-moving members in fixed positions.

While a preferred embodiment of the invention has been described in detail, it will be apparent that various modifications or alterations may be made therein without departing from the spirit and scope of the invention.

I claim:

1. In a machine tool operable to relatively position selectively both a workpiece and a tool along plural axes and perform a machine operation: a bed, a column extending from said bed, a tool spindlehead member movable in a straight path along said column, a rotatable tool spindle member supported by said spindlehead member, a first slide member on said bed movable in a straight path normal to the path of movement of said spindlehead member, a second slide member on said first slide member movable in a straight path normal to the path of movement of said first slide member, one of said paths of movement of said first and second slide members being parallel with the axis of rotation of said spindle member, a first variable-speed constant-mesh drive means for moving said spindlehead member selectively along its path of movement in both directions at traverse and feed speeds, a second variable speed constant mesh drive means including a motor carried by said first slide for moving said slide members selectively along their paths of movement in both directions at traverse and feed speeds.

2. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member, a first variable-speed motor, drive means connecting said motor to the rotatable one of said first lead screw and nut members, a first slide member on said bed movable in a straight path normal to the path of movement of said spindlehead member, a second lead screw member and a cooperating second nut member for moving said first slide member along its path of movement, said second lead screw member being supported by and fixed against axial movement relative to one of said first slide member and bed, said second nut member being supported by the other of said first slide member and bed, and one of said second nut member and lead screw being rotatable, the rotatable one being carried by said first slide member, a work-carrying second slide member on said first slide member movable in a straight path normal to the path of movement of said first slide member, a third lead screw member and a cooperating third nut member for moving said second slide member relative to said first slide member, said third lead screw member being supported by and fixed against axial movement relative to one of said first and second slide members, said third nut member being carried by the other of said first and second slide members, and one of said third lead screw member and third nut member being rotatable, the rotatable one being carried by said first slide member, a second variable-speed motor supported by said first slide member, and drive means for selectively connecting said second motor to said rotatable ones of said second and third nut members and lead screw members.

3. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member, a first variable-speed motor, drive means connecting said motor to the rotatable one of said first lead screw and nut members, a first slide member on said bed movable in a straight path normal to the path of movement of said spindlehead member, a second lead screw member fixedly supported by said bed and a cooperating second nut member rotatably connected to said first slide member for moving said first slide member along its path of movement, a work-carrying second slide member on said first slide member movable in a straight path normal to the path of movement of said first slide member, a third lead screw member rotatably supported by said first slide member and a cooperating third nut member fixedly connected to said second slide member for moving said second slide member relative to said first slide member, a second variable-speed motor supported by said first slide member, and drive means for selectively connecting said second motor to said second nut member and said third lead screw member.

4. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member, a first variable-speed motor, drive means including a planetary speed change transmission for connecting said motor to the rotatable one of said first lead screw and nut members, a first slide member on said bed movable in a straight path normal to the path of movement of said spindlehead member, a second lead screw member and a cooperating second nut member for moving said first slide member along its path of movement, said second lead screw member being supported by and fixed against axial movement relative to one of said first slide member and bed, said second nut member being supported by the other of said first slide member and bed, and one of said second nut member and lead screw being rotatable, the rotatable one being carried by said first slide member, a work-carrying second slide member on said first slide member movable in a straight path normal to the path of movement of said first slide member, a third lead screw member and a cooperating third nut member for moving said second slide member relative to said first slide member, said third lead screw member being supported by and fixed against axial movement relative to one of said first and second slide members, said third nut member being carried by the other of said first and second slide members, and one of said third lead screw member and third nut member being rotatable, the rotatable one being carried by said first slide member, a second variable-speed motor supported by said first slide member, and drive means including a planetary speed change transmission and selectively operable clutches for selectively connecting said second motor to said rotatable ones of said second and third nut members and lead screw members.

5. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member, a first variable-speed motor, drive means including a planetary speed change transmission for connecting said motor to the rotatable one of said first lead screw and nut members, a first slide member on said bed movable in a straight path normal to the path of movement of said spindlehead member, a second lead screw member fixedly supported by said bed and a cooperating second nut member rotatably connected to said first slide member for moving said first slide member along its path of movement, a work-carrying second slide member on said first slide member movable in a straight path normal to the path of movement of said first slide member, a third lead screw member rotatably supported by said first slide member and a cooperating third nut member fixedly connected to said second slide member for moving said second slide member relative to said first slide member, a second variable-speed motor supported by said first slide member, and drive means including a planetary speed change transmission and selectively operable clutches for selectively connecting said second motor to said second nut member and said third lead screw member.

6. In a machine tool operable to relatively position selectively both a workpiece and a tool along plural axes and perform a machine operation: a bed, a column extending from said bed, a tool spindlehead member movable in a straight path along said column, a rotatable tool spindle member supported by said spindlehead member for movement relative thereto in a path normal to the path of movement of said spindlehead member, a first slide member on said bed movable in a straight path normal to the path of movement of said spindlehead member, a second slide member on said first slide member movable in a straight path normal to the path of movement of said first slide member, one of said paths of movement of said first and second slide members being parallel with the axis of rotation of said spindle member, a first variable-speed constant-mesh drive means for moving said spindlehead member selectively along its path of movement in both directions and for selectively moving said rotatable tool spindle member along its path of movement normal to that of the spindlehead member at traverse and feed speeds, a second variable-speed constant-mesh drive means including a motor carried by said first slide for moving said slide members selectively along their paths of movement in both directions at traverse and feed speeds.

7. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle, said second nut being carried by and fixed against axial movement relative to the other of said spindle and spindlehead member and one of said second lead screw and second nut being rotatable, a first variable-speed motor, drive means including a planetary speed change transmission and selectively operable clutches for selectively connecting said motor to the rotatable ones of said first and second lead screws and nut members, a first slide member on said bed movable in a straight path normal to the path of movement of said head member, a third lead screw member and a cooperating third nut member for moving said first slide member along its path of movement, said third lead screw member being supported by and fixed against axial movement relative to one of said first slide member and bed, said third nut member being supported by the other of said first slide member and bed, and one of said third nut member and lead screw being rotatable, the rotatable one being carried by said first slide member, a work-carrying second slide member on said first slide member movable in a straight path normal to the path of movement of said first slide member, a fourth lead screw member and a cooperating fourth nut member for moving said second slide member relative to said first slide member, said fourth lead screw member being supported by and fixed against axial movement relative to one of said first and third slide members, said fourth nut member being carried by the other of said first and third slide members, and one of said fourth lead screw member and fourth nut member being rotatable, the rotatable one being carried by said first slide member, a second variable-speed motor supported by said first slide member, and drive means including a planetary speed change transmission and selectively operable clutches for selectively connecting said second motor to said rotatable ones of said third and fourth nut members and lead screw members.

8. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle, said second nut being carried by and fixed against axial movement relative to the other of said spindle and spindlehead member and one of said second lead screw and a second nut being rotatable, a first variable-speed motor, drive means including a planetary speed change transmission and selectively operable clutches for selectively connecting said motor to the rotatable ones of said first and second lead screws and nut members, a first slide member on said bed movable in a straight path normal to the path of movement of said spindlehead member, a third lead screw member fixedly supported by said bed and a cooperating third nut member rotatably connected to said first slide member for moving said first slide member along its path of movement, a work-carrying second slide member on said first slide member movable in a straight path normal to the path of movement of said first slide member, a fourth lead screw member rotatably supported by said first slide member and a cooperating fourth nut member fixedly connected to said second slide member for moving said second slide member relative to said first slide member, a second variable-speed motor supported by said first slide member, and drive means including a planetary speed change transmission and selectively operable clutches for selectively connecting said second motor to said third nut member and said fourth lead screw member.

9. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said head member along said column, a rotatable tool spindle member supported by said tool spindlehead member, a first variable-speed motor, drive means including a planetary speed change transmission for connecting said motor to the rotatable one of said first lead screw and nut members, a first slide member on said bed movable in a straight path normal to the path of movement of said head member, a second lead screw member and a cooperating second nut member for moving said first slide member along its path of movement, said second lead screw member being supported by and fixed against axial movement relative to one of said first slide member and bed, said second nut member being supported by the other of said first slide member and bed, and one of said second nut member and lead screw being rotatable, the rotatable one being carried by said first slide member, a work-carrying second slide member on said first slide member movable in a straight path normal to the path of movement of said first slide member, a third lead screw member and a cooperating third nut member for moving said second slide member relative to said first slide member, said third lead screw member being supported by and fixed against axial movement relative to one of said first and second slide members, said third nut member being carried by the other of said first and second slide members, and one of said third lead screw member and third nut member being rotatable, the rotatable one being carried by said first slide member, a second variable-speed motor supported by said first slide member, drive means including a planetary speed change transmission and selectively operable clutches for selectively connecting said second motor to said rotatable ones of said second and third nut members and lead screw members, and a selectively operable brake for each of the rotatable ones of said first, second and third nut members and lead screw members.

10. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle, said second nut being carried by and fixed against axial movement relative to the other of said spindle and spindlehead member and one of said second lead screw and a second nut being rotatable, a first variable-speed motor, drive means including a planetary speed change transmission and selectively operable clutches for selectively connecting said motor to the rotatable ones of said first and second lead screws and nut members, a first slide member on said bed movable in a straight path normal to the path of movement of said head member, a third lead screw member and a cooperating third nut member for moving said first slide member along its path of movement, said third lead screw member being supported by and fixed against axial movement relative to one of said first slide member and bed, said third nut member being supported by the other of said first slide member and bed and one of said third nut member and lead screw being rotatable, the rotatable one being carried by said first slide member, a work-carrying second slide member on said first slide member movable in a straight path normal to the path of movement of said first slide member, a fourth lead screw member and a cooperating fourth nut member for moving said second slide member relative to said first slide member, said fourth lead screw member being supported by and fixed against axial movement relative to one of said first and third slide members, said fourth nut member being carried by the other of said first and third slide members and one of said fourth lead screw members and fourth nut member being rotatable, the rotatable one being carried by said first slide member, a second variable-speed motor supported by said first slide member, and drive means including a planetary speed change transmission and selectively operable clutches for selectively connecting said second motor to said rotatable ones of said third and fourth nut members and lead screw members, and a selectively operable brake for each of the rotatable ones of said first, second, third and fourth nut members and lead screw members, each brake having a disc carried by each of said rotatable members, a fixed abutment against which the disc can be flexed into contact, and means to flex the disc and hold it against the abutment.

11. In a machine tool operable to relatively position selectively both a workpiece and a tool along plural axes and perform a machine operation: a bed, a column extending from said bed, a tool spindlehead member movable in a straight path along said column, a rotatable tool spindle member supported by said spindlehead member, drive means including a motor supported on said column for moving the tool spindlehead along said column, a first slide member on said bed movable in a straight path normal to the path of movement of said spindlehead member, a second slide member on said first slide member movable in a straight path normal to the path of movement of said first slide member, one of said paths of movement of said first and second slide members being parallel with the axis of rotation of said spindle members, a first variable-speed constant-mesh drive means for moving said spindlehead member selectively along its path of movement in both directions at traverse and feed speeds, a second variable-speed constant-mesh drive means including a motor carried by said first slide for moving said slide members selectively along their paths of movement in both directions at traverse and feed speeds.

12. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle, said second nut being carried by and fixed against axial movement relative to the other of said spindle and spindlehead member and one of said second lead screw and a second nut being rotatable, a first variable-speed motor supported on said column, drive means including a planetary speed change transmission and selectively operable clutches for selectively connecting said motor to the rotatable ones of said first and second lead screws and nut members, a first slide member on said bed movable in a straight path normal to the path of movement of said head member, a third lead screw member and a cooperating third nut member for moving said first slide member along its path of movement, said third lead screw member being supported by and fixed against axial movement relative to one of said first slide member and bed, said third nut member being supported by the other of said first slide member and bed, and one of said third nut member and lead screw being rotatable, the rotatable one being carried by said first slide member, a work-carrying second slide member on said first slide member movable in a straight path normal to the path of movement of said first slide member, a fourth lead screw member and a cooperating fourth nut member for moving said second slide member relative to said first slide member, said fourth lead screw member being supported by and fixed against axial movement relative to one of said first and third slide members, said fourth nut member being carried by the other of said first and third slide members, and one of said fourth lead screw member and fourth nut member being rotatable, the rotatable one being carried by said first slide member, a second variable-speed motor supported by said first slide member, and drive means including a planetary speed change transmission and selectively operable clutches for selectively connecting said second motor to said rotatable ones of said third and fourth nut members and lead screw members and a selectively operable brake for each of the rotatable ones of said first, second, third and fourth nut members and lead screw members, each brake having a disc carried by each of said rotatable members, a fixed abutment against which the disc can be flexed into contact, and means to flex the disc and hold it against the abutment.

13. In a machine tool operable to relatively position selectively both a workpiece and a tool along plural axes and perform a machine operation: a bed, a column extending from said bed, a tool spindlehead member movable in a straight path along said column, drive means including a motor carried by one of said column and spindlehead member and a lead screw and cooperating nut member, one of which is rotatable and driven by said motor to move said spindlehead member along said column, a rotatable tool spindle member supported by said spindlehead member and a selectively operable brake having a flexible disc carried by the rotatable one of said lead screw and cooperating nut member, a fixed abutment against which the disc can be flexed into contact, and means to flex the disc and hold it against the abutment.

14. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle, said second nut being carried by and fixed against axial movement relative to the other of said spindle and spindlehead member and one of said second lead screw and a second nut being rotatable, a first variable-speed motor, and drive means including a planetary speed change transmission and selectively operable clutches for selectively connecting said motor to the rotatable ones of said first and second lead screws and nut members.

15. In a machine tool operable to relatively position selectively both a workpiece and a tool along plural axes and perform a machine operation: a bed, a column extending from said bed, a tool spindlehead member slidably supported on said column for movement in a straight path, a first lead screw member and a cooperating first nut member one of which is rotatable for moving said spindlehead member along said column, a rotatable tool spindle member supported by said tool spindlehead member for movement relative thereto in a path normal to the path of movement of said spindlehead member, a second lead screw and a cooperating second nut for moving said spindle member relative to said spindlehead member, said second lead screw being supported by and fixed against axial movement relative to one of said spindlehead member and spindle member, said second nut being carried by and fixed against axial movement relative to the other of said spindle member and spindlehead member and one of said second lead screw and a second nut being rotatable, a first variable-speed motor, drive means including a planetary speed change transmission and selectively operable clutches for selectively connecting said motor to the rotatable ones of said first and second lead screws and nut members, and a selectively operable brake for each of the rotatable ones of said first and second lead screw members and nut members, each brake having a flexible disc carried by each of said rotatable members, a fixed abutment against which the disc can be flexed into contact, and means to flex the disc and hold it against the abutment.

* * * * *